July 23, 1946.                T. O. SUMMERS, JR                    2,404,603
                   ATTITUDE-INDICATING FLIGHT INSTRUMENT
                      Filed Jan. 4, 1943         3 Sheets-Sheet 1

INVENTOR.
THOMAS O. SUMMERS JR.
BY
                        ATTORNEY.

July 23, 1946.  T. O. SUMMERS, JR  2,404,603

ATTITUDE-INDICATING FLIGHT INSTRUMENT

Filed Jan. 4, 1943   3 Sheets-Sheet 2

INVENTOR.
THOMAS O. SUMMERS JR.
BY
ATTORNEY.

July 23, 1946.　　　T. O. SUMMERS, JR　　　2,404,603
ATTITUDE-INDICATING FLIGHT INSTRUMENT
Filed Jan. 4, 1943　　　3 Sheets-Sheet 3

INVENTOR.
Thomas O. Summers Jr.
BY
ATTORNEY.

Patented July 23, 1946

2,404,603

UNITED STATES PATENT OFFICE 2,404,603

ATTITUDE-INDICATING FLIGHT INSTRUMENT

Thomas O. Summers, Jr., Los Angeles, Calif.

Application January 4, 1943, Serial No. 471,259

10 Claims. (Cl. 33—204)

This invention relates to attitude-indicating flight instruments and more particularly to instruments of the type commonly used as an aid to navigation of an aircraft and wherein an aircraft semblance is caused by gyroscopic stabilization to depict pitch and roll of the aircraft.

An object of the present invention is to provide an attitude-indicating flight instrument which includes a combination of cooperatively associated indicators, one of which shows direction and extent of pitch while another shows direction and extent of roll, with the result that observation of this single instrument, even if by only a single hurried glance, will impart to the pilot all of the data required to enable him to keep his ship in the desired flying attitude.

Since the "lift" of an airplane is dependent upon several variable factors, such as trim, air speed, total load, and load distribution, it frequently occurs that, in order to fly at constant elevation, the attitude of an airplane with respect to the horizontal must be varied to compensate for variation in one or more of those factors. For example, if the total load weight is decreased or if the center of gravity of the load is moved aft while the air speed is permitted to remain constant, as frequently occurs during bombing operations, it is necessary for the ship to fly with its tail slightly higher in order to avoid its increasing its altitude. Consequently it has proved desirable to provide attitude-indicating instruments with an adjustment whereby a pilot is enabled to set the indicating member to a zero-reading position when he knows his craft is flying at constant elevation and thereafter rely upon the instrument to show whether his craft is flying at constant elevation, and if not at how much deviation therefrom, rather than whether or not the ship itself is in any particular attitude with respect to the horizontal.

In those instruments in which an adjustment of the character indicated is provided it is customary to make the adjustment in the position of the datum marker, i. e., the indicator which is mounted directly upon the housing of the instrument and which therefore serves merely as a basis of reference with which the gyroscopically stabilized indicator may be compared in reading the instrument to determine pitch. However, certain inherent disadvantages lie in providing the adjustment in connection with the datum marker. One such disadvantage is that it necessitates providing a support for the adjustable marker which necessarily is positioned closely adjacent the transparent window through which the indicating media are observed, with the result that this support not only obscures vision through the window and thereby complicates the matter of reading the instrument, but it also actually occupies a position in front of the instrument's dial which could be employed most advantageously for a more beneficial purpose, such as for the accommodation of the reference scale for an indicator used to indicate direction and extent of rolling movements of the craft. Heretofore, since the adjustable datum support has necessarily obscured the view of an appreciable portion of the lower half of the instrument's dial, it has been necessary to position this reference scale in the upper half of the dial where it must be used to measure movements of the upper end of the vertical indicating reference. It is for this reason that the roll-indicating marker of an instrument of this type and constructed according to conventional design, while showing correctly the degree or extent of roll, moves backward over the scale and therefore indicates direction of bank incorrectly. That is to say, in a conventional instrument the roll pointer moves to the left across its associated scale when the aircraft banks to the right, and toward the right when the aircraft banks to the left. This confusing situation is remedied by the instrument of the present invention wherein the pitch-indicating datum marker is affixed directly to the transparent window of the instrument, thereby obviating the necessity of providing any other support therefor and leaving the entire portion of the dial which is below the datum marker completely unobscured. As a result, the scale of the vertical indicator can be accommodated conveniently in this more advantageous position, thus permitting use of the lower end of the vertical indicator with the result that it shows not only the extent of roll but also the direction. Another advantage of providing the adjustable feature in conjunction with the gyroscopically stabilized indicator instead of with the datum marker is that by so doing the two indicating media are disposed at the exact center of the transparent window when in their zero-reading position, instead of in a position considerably displaced from the center, as frequently occurs with more conventional instruments of this type.

Therefore one of the main objects of the present invention is to provide an attitude-indicating flight instrument of the general character described, wherein the datum marker is mounted in fixed position upon the transparent face of the instrument and which includes means for adjusting the other of the two cooperating pitch-indicating markers so that the pilot is enabled to set it to zero-reading position by manual operation.

Another object is to provide an attitude-indicating flight instrument of the character described, wherein the datum marker of the pitch indicator is mounted directly upon the crystal face of the instrument and therefore does not require any bracket or other form of support which would obscure view of any portion of the dial therebehind, and wherein advantage is taken of the fact that the lower part of the dial thus has been made available, by placing the reference scale for the vertical-indicating pointer in that part of the dial, instead of in the upper part, as has been done heretofore, and thereby so arranging the instrument that it gives a true reading of the direction, as well as the extent, of roll.

Yet another object is to construct the adjustment for the gyroscopically stabilized indicator in such a manner, and so to associate it with its stabilizing gyro vertical, that although the indicator actually is stabilized so as to permit the casing of the instrument, and with it the fixed datum marker, to move in rotary motion around the stabilized indicator, that indicator actually is caused to move slightly in the opposite direction and thereby amplify the apparent movement of the indicator to make reading of the instrument easier and more positive.

A further object of my present invention is to provide an instrument having a manually adjustable gyroscopically stabilized indicator as described, which is particularly adapted for, but is not necessarily limited to, use in an instrument wherein the actuating forces are derived from a gyro vertical, the erecting mechanism of which is constructed in accordance with the principles forming part of the subject matter of my co-pending application, Serial No. 462,943, filed October 22, 1942.

The invention possesses other objects and valuable features, some of which, with those enumerated, will be set forth in the following description of the preferred embodiment of my invention illustrated in the drawings accompanying and forming part of the specification. It is to be understood that I do not limit myself to the showing made by the said drawings and description, as I may adopt variations of the preferred form within the scope of my invention as defined by the plans.

Referring to the drawings.

Figure 1:
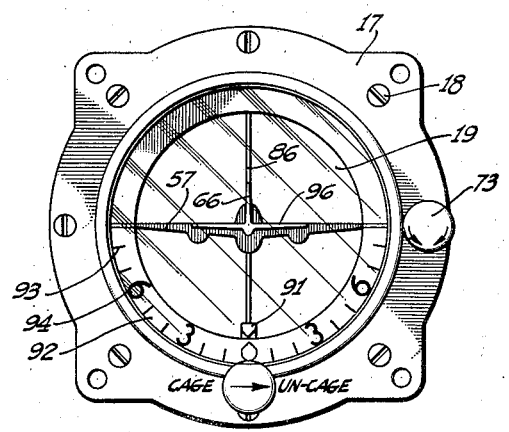
Figure 1 is a face view of a flight-indicating instrument incorporating the principles of the present invention and showing the indicating media thereof in the respective positions occupied thereby when the plane carrying the instrument is in level flight.

The preferred embodiment of the flight-indicating instrument of the present invention is shown as being enclosed within a suitable housing or casing adapted for mounting upon the instrument panel of an airplane. The front wall 17, which preferably is removably secured to the body of the casing 16 as by a plurality of screws 18, carries a crystal face, or window 19 through which may be observed the indicating media of the instrument.

The mechanism for operating these indicating media comprises a gyro vertical indicated in its entirety at 21 and supported in a gimbal ring 22 for rotary movement about a transverse axis by aligned bearings 23. The gimbal ring 22 is supported for movement about a longitudinal axis by aligned bearings 24 which connect the gimbal ring 22 to the housing 16. The forward one of the two bearings 24 is carried by a pillar 26 rigid with and extending upwards from the bottom of the housing 16. This pillar also carries a background shield 27 which preferably is in the form of a segment of a sphere the center of which lies substantially at the intersection of the transverse and longitudinal gimbal axes. Since the diameter of the shield 27 is somewhat greater than that of the opening in the front wall 17 of the housing 16 with which the crystal face 19 is associated the shield 27 serves to hide the internal mechanism of the instrument leaving only the indicating media visible through the crystal face 19.

As explained, the gyro vertical 21 is mounted for universal movement about the transverse and longitudinal gimbal axes; but the extent of such movement is limited by preferably cushioned stops 28 and 29. The stop 28 is carried by the rotor-bearing casing 31 of the gyro vertical 21 in such position that it will engage a portion of the gimbal ring 22 and thereby limit movement of the gyro vertical 21 about its transverse axis; and the stop 29 which is carried by the gimbal ring 22 is adapted to engage either one or the other of two laterally extending ears 32 which are provided on the upper end of the pillar 26, and thereby limit motion of the gimbal ring 23 and the gyro vertical 21 about the longitudinal gimbal axis.

In the modification illustrated and here being described, the gyro vertical 21 is of the type described more particularly in my co-pending application Serial No. 462,943, filed October 22, 1942, inasmuch as the erecting mechanism which forms an important portion thereof takes the form of a pair of crossed, bail like, substantially semi-circular stator members 36 and 37. These stators 36 and 37 extend transversely and longitudinally, respectively, with respect to the instrument, and both are engaged by a rotor 38 which is an upward extension of the shaft of the gyroscope's rotor (not shown) whenever displacement of the gyro vertical from its vertical position occurs. The stator 36 is mounted for rotary movement about an axis extending transversely of the casing 16 for which purpose one end 39 of the stator 36 is pivoted directly to the casing 16 as by a pivot pin 41. At its diametrically opposite point, however, the housing 16 has an opening 42 closed by a cover plate 43 spaced outward slightly from the associated portion of the housing 16 by an outwardly extending flange 44. Hence, in order to provide support for the other end 46 of the stator 36, a bracket 47 is secured to the housing 16 below the opening 42 and extending downwards to support a pivot pin 48 for the end 46 in axial alignment with the pin 41. Thus it may be seen that the semi-circular stator 36, because of the engagement of the upper end of the rotor shaft 38 therewith, will follow the movements of the gyro vertical 21 about its transverse gimbal axis regardless of the position of the gimbal ring 22 within the housing 16.

Carried by the cover plate 43 and preferably in a position spaced from the axis of the transverse stator 36 is a tubular bearing 51 having a pin 52 rotatable therein and extending therethrough, with an arm 53 supported upon the inner end of the pin 52. Preferably both the bearing 51 and the pin 52 are materially elongated so as to minimize the tendency for the pin 52 to bind within its bearing tube 51 and thereby contribute to the freedom of movement of the arm 53 about the axis of its supporting pin 51.

Figure 2:
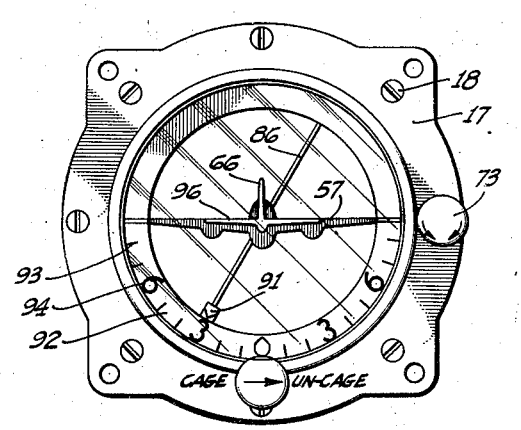
Figure 2 is a view similar to Figure 1 but showing the vertical-indicating marker moved to show that the ship is in a 30° left bank.
Figure 3:
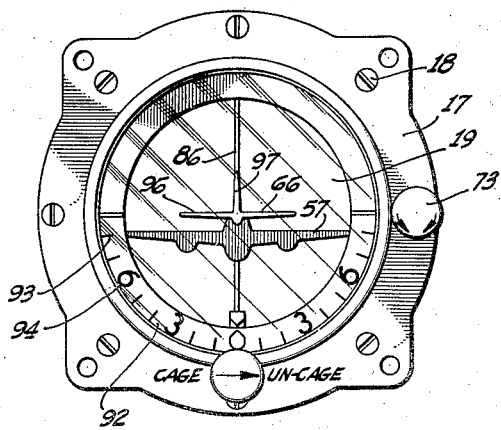
Figure 3 is another view similar to Figure 1 but with the indicator showing that the ship is experiencing a "tail high" attitude.
Figure 4:
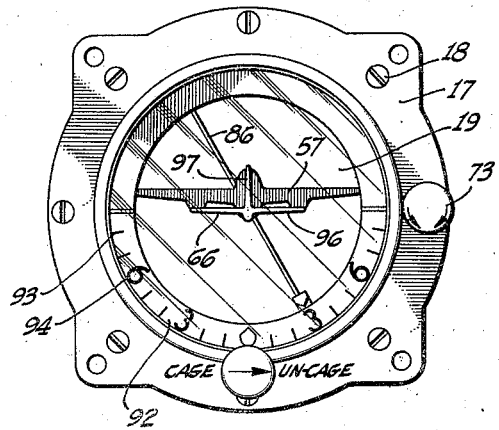
Figure 4 is another view similar to Figure 1 with the instrument indicating both a slightly "tail low" attitude and a 30° right bank.
Figure 5:
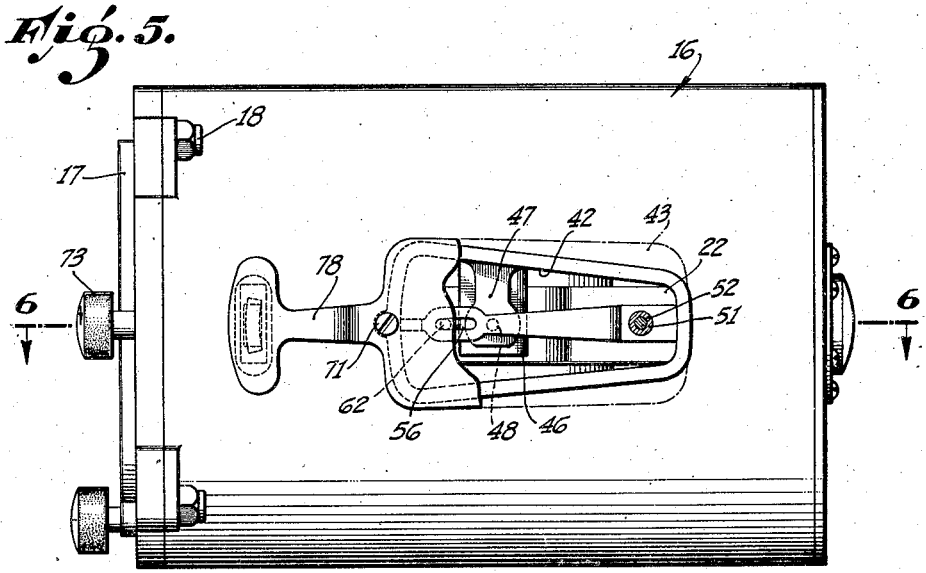
Figure 5 is a view in side elevation of the instrument of the present invention, a portion of its side cover plate being broken away to reveal a part of the internal mechanism.
Figure 6:
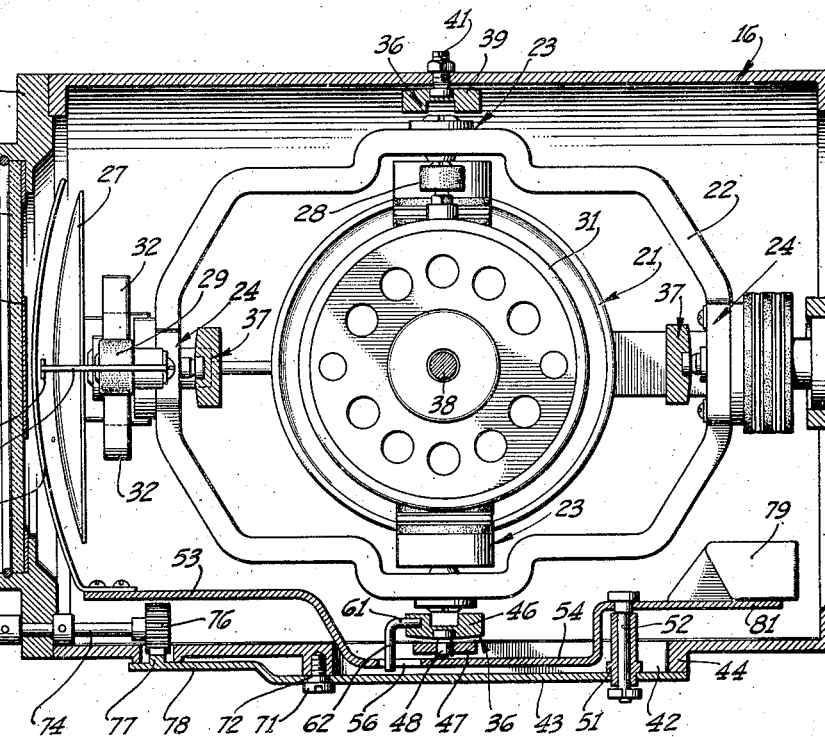
Figure 6 is a longitudinal, horizontal sectional view of the casing of the instrument, the plane of section being indicated by the line 6—6 of Figure 5 and the direction of view by the arrows, and showing most of the internal mechanism in top plan.
Figure 7:
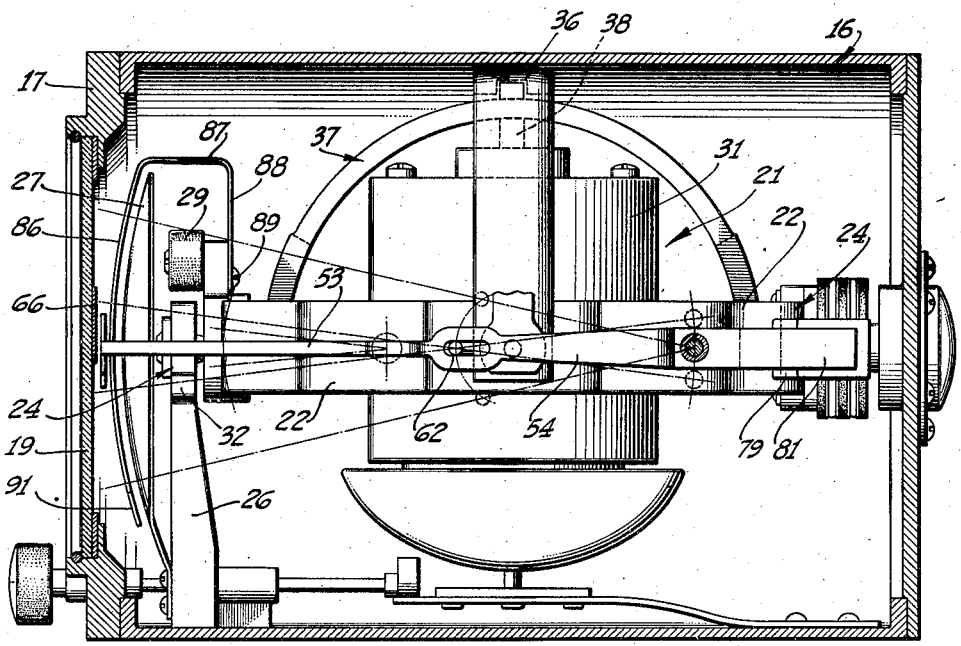
Figure 7 is a longitudinal, vertical sectional view of the casing of the instrument, showing the internal mechanism of the instrument in side elevation.
Figure 8:
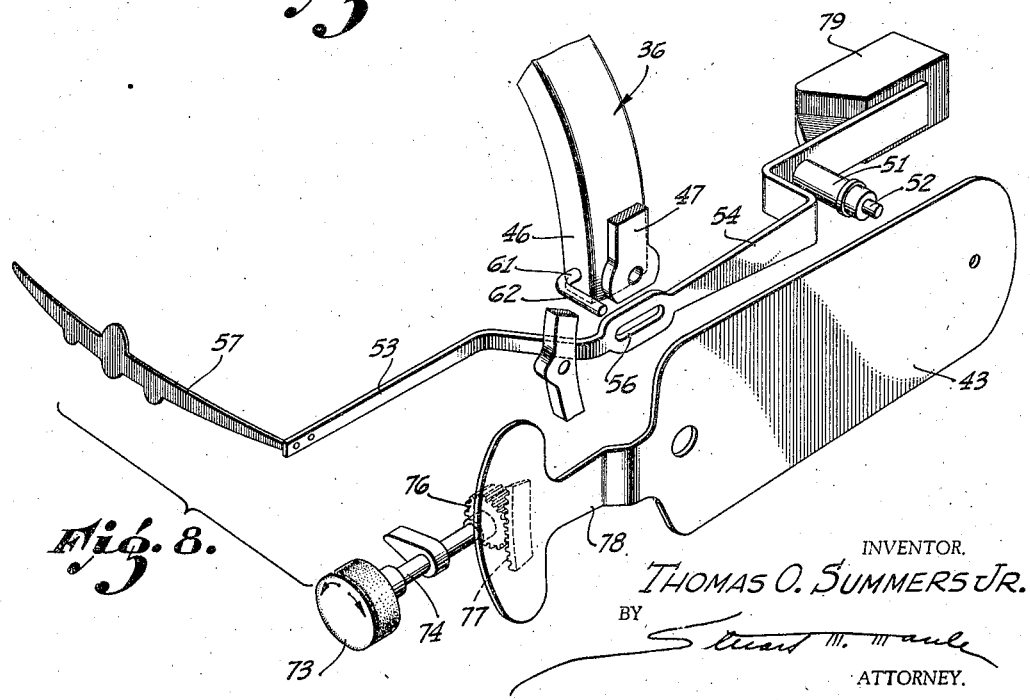
Figure 8 is an exploded view in perspective of the gyroscopically stabilized pitch indicator and the manually adjustable operating mechanism therefor.

The arm 53 is provided with an outwardly deflected portion 54 forward of its supporting pin 51 to enable the arm 53 to extend around and past the proximal end 46 of the stator element 36. It is for the accommodation of this outwardly deflected portion 54 without unduly enlarging the housing 16 that the opening 42 and the outwardly extending flange 44 are provided. Forward of the bracket 47 the arm is provided with a longitudinally extending slot 56; and forward of the slot the arm 53 is deflected inwards again to clear the forward portion of the flange 44. To the extreme forward end of the arm 53 an indicator bar 57 is affixed. This indicator bar 57 extends transversely across the housing 16 just forward of the background shield 27 where it is visible through the crystal face 19. Preferably this transverse indicator bar 57 is shaped to simulate the forward wing portion of an airplane as clearly shown in Figures 1 to 4, inclusive, and 8, and, since its supporting arm 53 is pivoted to the housing 16 of the instrument it will remain at all times parallel to the transverse axis of the airplane in which the instrument is mounted, with the result that it serves as an indicator useful to show lateral inclination, or roll of the aircraft on which the instrument is mounted.

Means are provided, however, for connecting the supporting arm 53 to the stator element 36 in such a manner as to utilize the gyro vertical 21 for the stabilization of the indicator bar 57. Hence the housing 16 moves in rotary motion about the transverse gimbal axis and with respect to the bar 57 during pitching movements of the aircraft, with the result that the indicator bar 57 can be relied upon also to indicate direction and extent of such pitching movements. A pin 61 rigid with the stator element 36 extends forward therefrom, and preferably radially from the axis about which the stator element 36 is movable. The forward end 62 of the pin 61 is deflected outwards to be engaged slidably within the slot 56 in the arm 53 with the result that when the stator 36 swings forward about its axis of support the supporting arm 53 will swing downwards about the axis of its supporting pin 51. To describe the action more precisely, however, in actual use the stator element 36, the arm 53 which is connected thereto, and the indicator bar 57 are stabilized by the gyro vertical 21 and hence remain substantially stationary while the housing 16 moves with respect thereto with the result that to a person observing the indicator bar 57 through the crystal face 19 the bar 57 will appear to fall when the plane's attitude changes by lowering its forward portion, and to rise when the nose of the ship is raised.

In order to facilitate ready determination of the direction and extent of any such apparent motion of the indicator bar 57 there is associated therewith a datum marker 66 which is rigidly secured to the casing 16, preferably by being permanently fastened to the inner side of the crystal face 19, and substantially at its center. The datum marker 66 preferably is so shaped that it simulates the after or tail portion of an airplane, and since the datum marker 66 is to be observed in connection with the bar 57 it is preferred that these two bars be so proportioned with respect to each other that the two, when observed simultaneously, closely simulate the appearance of an actual aircraft when viewed from some distance astern thereof. Therefore when the plane on which the instrument is mounted alters its attitude, say for example, so as to assume a "tail high" position, the horizontal indicator bar 57 will remain substantially stationary while the datum marker is carried upward with respect thereto with the result that these parts assume a position such as that illustrated in Figure 3 wherein the two indicators 57 and 66 closely simulate the appearance of an actual aircraft in "tail high" position and viewed from astern. Should the plane assume a "tail low" position the action will be reversed, the datum marker 66 moving downwards from its zero-reading position so that the instrument presents an appearance such as that illustrated in Figure 4. Consequently these two indicators 57 and 66 are of such form and cooperate with each other in such a manner that they do not require any interpretation, i. e., it is not necessary for the pilot to convert in his own mind the indications of the instrument to terms which will enable him to operate his controls properly. By presenting an instrument in which the indicators actually simulate a real airplane and also simulate the movements of the fore-and-after ends of an airplane, the movements which the airplane is experiencing are depicted, and the pilot is enabled thereby to develop without mental effort those mental reactions which are necessary for the proper maneuvering of his ship.

Adjusting means are provided for shifting the transverse indicator 57 without effecting any movement of the stator element 36 or the gyro vertical 21. This is for the purpose of enabling the pilot to move the indicator 57 into accurate alignment with the datum marker 66 while the ship is flying under such conditions that it is abnormally "tail high" or "tail low." The cover plate 43 for the opening 42, instead of being rigidly secured to the casing 16, is attached adjacent one end only by a single screw 71 which has a shoulder 72 thereon which is slightly wider than the thickness of the cover plate 43 and which, therefore, tightens against the outer face of the flange 44 into which the screw 71 is threaded so as to leave the cover plate 43 free to pivot about the axis of the screw 71. Such pivotal movement of the cover plate 43 results in raising or lowering the pin 52 upon which arm 53 is mounted; and when such movement of the pin 52 occurs the arm will pivot about that portion 62 of the pin 61 which is engaged within the slot 56 and thereby affect vertical adjustment of the indicating bar 57. A manually rotatable knob 73 accessible at the front of the instrument is carried by a shaft 74 which is revolubly mounted in the front wall and extends therethrough to receive a pinion 76 which is rigid with its inner end and which is enmeshed with rack teeth 77 carried by a forward extension 78 of the cover plate 43. Accordingly by turning the knob 73 the pilot can move the cover plate 43 about the axis of its fulcrum screw 71 and thereby raise or lower the pin 52 depending upon the direction in which the knob is turned. When such vertical movement of the pin 52 occurs the arm 53 will swing about the laterally extending portion 62 of the pin 61 thus transmitting vertical movement to the horizontal indicator 57. In this manner the pilot can bring the indicating bar 57 accurately into alignment with the datum marker 66 without requiring any movement of the stabilizing mechanism. The reason that such adjustment of the bar 57 with respect to its stabilizing means is advantageous is that it permits compensation for different flying conditions such as variation in the weight or arrangement of the load which necessitates that the ship be flown at a slightly different attitude in order to maintain level flight. After the pilot has ascertained that his ship is maintaining constant elevation, he can, by manipulating the knob 73, bring the indicating bar 57 into proper registry with the datum marker 66, and thereafter, by glancing at the instrument ascertain whether or not the ship is maintaining level flight without having to pay any attention to the exact attitude of his ship with respect to the horizontal.

Since it is desirable that the arm 53 be able to move about the axis of the pin 52 with maximum freedom so as to impose a minimum of reactive force upon the stator element 36, it is preferred that the arm 53 be in substantially perfect balance and therefore a counterweight 79 of appropriate mass to accomplish this purpose is mounted upon the end 81 of the arm 53 which is opposite the indicating bar 57.

It will be observed that vertical movement of the indicating bar 57 which results from rotary motion of the stator element 36 entails movement of the arm 53 as a lever about the pin 52 as its fulcrum support. Consequently vertical movement of the indicator bar 57 produced in this manner will be amplified as compared with the extent of movement which it would experience were the bar 57 disposed more closely adjacent the point of interconnection between the arm 53 and the pin 61. For this reason, instead of being held truly stationary by its stabilizing mechanism while its housing rotates with respect thereto the indicator bar 57 actually will be moved slightly in the opposite direction. That is to say, when the datum marker 66 moves upwards to indicate that the ship carrying the instrument is nosing downwards the indicator bar 57 will move downwards slightly (see Figure 3) while the crystal face 19 and the datum marker 66 carried thereby moves upwards. In this manner the extent of relative movement between the two indicating references 57 and 66, is so amplified that even slight deviation of the airplane from level flight is instantly made apparent.

The instrument also includes a third indicator 86 in the form of a vertically extending bar disposed between the background shield 27 and the crystal face 19. This vertical indicator 86 is maintained vertical regardless of the movements experienced by the housing 16, by the gimbal ring 22, upon which it is mounted. The upper end 87 of the indicator 86 is deflected horizontally and then downwards as at 88 so as to permit attachment of the bar 86 rigidly to the gimbal 22 as by a screw 89. Consequently the bar 86 provides a convenient reference line which is always visible through the crystal face 19 and is always disposed in an accurately vertical position with the result that by referring to it the pilot can inform himself instantly as to the attitude of his ship as far as lateral inclination or roll is concerned.

By associating a reference scale with the vertical indicator 86 to be read in conjunction therewith the pilot is enabled to ascertain the extent of such lateral inclination in addition to direction thereof. In more conventionally constructed instruments it has been customary to associate such a reference scale with the upper end of the vertical indicator, probably for the reason that visibility of the lower half of the dial of such instruments is obscured by a supporting bracket for the datum marker of the pitch indicating media. However, in the present invention, as explained hereinabove, the datum marker 66 is mounted directly upon the crystal face 19 as by being bonded permanently thereto. Such mounting for the datum marker 66 eliminates the necessity for a supporting bracket or other structure apt to obscure vision of the lower half of the dial and therefore I have provided a pointer 91 on the lower end of the vertical indicator 16, and a reference scale 92 carrying calibrations 93 and indicia 94 around the lower half of the circumference of the crystal face 19. Whereas the number of calibrations employed and the numerical value of the indicia may be varied to suit any particular set of circumstances, the type illustrated show the lower half of the dial divided into eighteen spaces with the result that each calibration indicates 10° of roll.

Positioning the reference scale 92 for the vertical indicator 96 in the lower half of the dial as explained, instead of in the upper half as has been done heretofore, is advantageous for the reason that it gives a true reading of the direction of roll. For example, if the plane carrying the instrument rolls to the left, the vertical indicator 86 being stabilized by the gyro vertical 21 will remain vertical while the other visible portions of the instrument, including the scale 92, will rotate in counter-clockwise motion, with the result that although the scale 92 moves to the right past the pointer 91 of the indicator 96, the motion of these parts which is apparent to the pilot is movement of the indicating bar 86 wherein the pointer 91 moves to the left across the scale 92, i. e., in the same direction as that in which the plane has rolled. Correspondingly when the ship banks to the right, the pointer 91 appears to move to the right across the scale 92.

As a further aid in determining direction and extent of lateral inclination, the datum marker 66 also serves as a basis of comparison with respect to which apparent movement of the vertical indicating bar 86 may be observed. Since the datum marker 66 simulates the tail portion of an airplane it includes a pair of opposed laterally extending members 96 which simulate the horizontal rudders and a vertically extending portion 97 which simulates the vertical rudder. Consequently, the vertical portion 97 serves as a visual aid in determining displacement of the plane from horizontal attitude. When the ship is not experiencing any lateral inclination, the vertical portion 97 of the datum marker 66 overlies the vertical indicating bar 86. However, immediately upon any displacement of the ship from its horizontal attitude the vertical portion 97 moves away from its position of alignment with the vertical bar 86 thus developing angularity between these two members which is highly obvious and therefore operates as a signal to call attention to the fact that the ship is no longer in truly horizontal attitude.

I claim:

1. In an attitude-indicating flight instrument, a housing, a gyro vertical mounted therein for freedom of movement about at least two normally horizontal axes, an indicator movably mounted within said housing, means connecting said indicator to said gyro vertical, said connecting means comprising a pivotally mounted lever, manually operable means for moving said lever, means carried by said lever providing a fulcrum, an arm pivotally supported by said fulcrum, said indicator being carried by said arm, and means connecting said gyro vertical to said arm to control movement of said indicator as said housing moves with respect to said gyro vertical.

2. In an attitude-indicating flight instrument, a housing, a gyro vertical mounted therein for freedom of movement about at least two normally horizontal axes, an indicator movably mounted within said housing, means connecting said indicator to said gyro vertical, said connecting means comprising a lever pivotally mounted for movement about an axis parallel to the normal position of one of said horizontal axes, means carried by said lever providing a fulcrum with its axis parallel to that of said lever, an arm pivotally supported by said fulcrum and carrying said indicator, and means connecting said gyro vertical to said arm to control movement of said arm and indicator about said axis of said fulcrum as said housing moves with respect to said gyro vertical.

3. In an attitude-indicating flight instrument, a housing, a gyro vertical mounted therein for freedom of movement about at least two normally horizontal axes, an indicator movably mounted within said housing, means connecting said indicator to said gyro vertical, said connecting means comprising a lever pivotally mounted for movement about an axis parallel to the normal position of one of said horizontal axes, means carried by said lever providing a fulcrum with its axis parallel to that of said lever, an arm pivotally supported by said fulcrum and carrying said indicator, said gyro vertical including a semi-circular member pivoted to said housing for movement about an axis coinciding with said normal position of said horizontal axis and connected to said gyroscope for movement therewith about said axis of said semi-circular member, and means connecting said semi-circular member to said arm whereby said gyro vertical controls movement of said arm and indicator about said axis of said fulcrum as said housing moves with respect to said gyro vertical.

4. In an attitude-indicating flight instrument, a housing, a gyro vertical therein comprising a gimbal mounted for movement about a longitudinal axis, a gyroscope mounted on said gimbal for movement about a normally horizontal axis perpendicular to that of said gimbal, and an erecting mechanism for said gyroscope, said erecting mechanism including a semi-circular member pivoted to said housing for movement about an axis coinciding with the normal position of said axis of movement of said gyroscope on said gimbal, said semi-circular member being connected to said gyroscope for movement therewith about said axis of said semi-circular member, an indicator movably mounted within said housing, and means connecting said indicator with said gyro vertical comprising a lever pivotally mounted on said housing for movement about an axis parallel to that of said semi-circular member, means for moving said lever and releasably retaining it in selected position, means carried by said lever providing a fulcrum spaced from said axis of said lever, an arm pivotally supported by said fulcrum, said indicator being carried by said arm, and means connecting said semi-circular member to said arm to be moved thereby whereby said gyro vertical controls movement of said arm and indicator as said housing moves with respect to the gyro vertical.

5. In an attitude-indicating flight instrument, a housing, a gyro vertical therein comprising a gimbal mounted for movement about a longitudinal axis, a gyroscope mounted on said gimbal for movement about a normally horizontal axis perpendicular to that of said gimbal, and an erecting mechanism for said gyroscope, said erecting mechanism including a semi-circular member pivoted to said housing for movement about an axis coinciding with the normal position of said axis of movement of said gyroscope on said gimbal, said semi-circular member being connected to said gyroscope for movement therewith about said axis of said semi-circular member, an indicator within said housing, and means connecting said indicator to said gyro vertical comprising an arm, a pivotal support for said arm disposed eccentrically with respect to said axis of said semi-circular member, said indicator being carried by said arm in position beyond said axis of said semi-circular member from the point of suspension of said arm, means connecting said semi-circular member to said arm to impart movement thereto coincidentally with relative movement between said gyroscope and said housing, and means for adjusting said pivotal support in a direction extending angularly with respect to said arm to vary the position of said indicator with respect to said gyroscope.

6. In an attitude-indicating flight instrument, a housing, a gyro vertical therein comprising a gimbal mounted for movement about a longitudinal axis, a gyroscope mounted on said gimbal for movement about a normally horizontal axis perpendicular to that of said gimbal, and an erecting mechanism for said gyroscope, said erecting mechanism including a semi-circular member pivoted to said housing for movement about an axis coinciding with the normal position of said axis of movement of said gyroscope on said gimbal, said semi-circular member being connected to said gyroscope for movement therewith about said axis of said semi-circular member, an indicator within said housing, means connecting said indicator to said gyro vertical comprising an arm carrying said indicator, means connecting said arm to said semi-circular member to be moved thereby coincidentally with relative movement between said gyroscope and said housing, means providing a fulcrum support for said arm comprising a lever pivotally mounted on said housing and means carried by one end of said lever pivotally supporting said arm, and manually operable means for moving said lever.

7. In an attitude-indicating flight instrument, a housing, a gyro vertical therein comprising a gimbal mounted for movement about a longitudinal axis, a gyroscope mounted on said gimbal for movement about a normally horizontal axis perpendicular to that of said gimbal, and an erecting mechanism for said gyroscope, said erecting mechanism including a semi-circular member pivoted to said housing for movement about an axis coinciding with the normal position of said axis of movement of said gyroscope on said gimbal, said semi-circular member being connected to said gyroscope for movement therewith about said axis of said semi-circular member, said housing having an opening therein in registry with the pivotal support for one end of said semi-circular member, an indicator within said housing, means connecting said indicator to said gyro vertical comprising an arm carrying said indicator, said arm being deflected into said opening in said housing to extend around and past said semi-circular member, means connecting said arm to said semi-circular member to be moved thereby coincidentally with relative movement between said gyroscope and said housing, and means providing a fulcrum support for said arm comprising a lever pivotally mounted on said housing and means carried by one end of said lever pivotally supporting said arm, and manually operable means for moving said lever.

8. In an attitude-indicating flight instrument, a housing, a gyro vertical therein comprising a gimbal mounted for movement about a longitudinal axis, a gyroscope mounted on said gimbal for movement about a normally horizontal axis perpendicular to that of said gimbal, and an erecting mechanism for said gyroscope, said erecting mechanism including a semi-circular member pivoted to said housing for movement about an axis coinciding with the normal position of said axis of movement of said gyroscope on said gimbal, said semi-circular member being connected to said gyroscope for movement therewith about said axis of said semi-circular member, said housing having an opening therein in registry with the pivotal support for one end of said semi-circular member, an indicator within said housing, means connecting said indicator to said gyro vertical comprising an arm carrying said indicator, said arm being deflected into said opening in said housing to extend around and past said semi-circular member, means connecting said arm to said semi-circular member to be moved thereby coincidentally with relative movement between said gyroscope and said housing, means providing a fulcrum support for said arm comprising a cover plate for said opening, means pivotally supporting said cover plate on said housing and intermediate its ends to present a lever, means carried by one end of said cover plate pivotally supporting said arm, and means connected to the other end of said cover plate for moving it about said pivotal support therefor.

9. In an attitude-indicating flight instrument, a housing, a gyro vertical mounted therein for freedom of movement about at least two normally horizontal axes, an indicator mounted for movement with respect to said housing, and means connecting said indicator to said gyro vertical, said connecting means comprising an adjustably mounted member, an arm pivotally mounted on said member and carrying said indicator, and means connecting said gyro vertical to said arm to control movement of said indicator as said housing moves with respect to said gyro vertical, and a device operable to adjust said member.

10. In an attitude-indicating flight instrument, a housing, a gyro vertical mounted therein for freedom of movement about at least two normally horizontal axes, an indicator mounted for movement with respect to said housing, means connecting said indicator to said gyro vertical, said connecting means comprising a member adjustably mounted for movement about an axis parallel to the normal position of one of said horizontal axes, an arm pivotally mounted on said member and carrying said indicator for movement about an axis parallel to such adjustment axis, and means connecting said gyro vertical to said arm to control movement of said arm and indicator about said last-named axis as said housing moves with respect to said gyro vertical, and a device operable to adjust said member.

THOMAS O. SUMMERS, Jr.